Feb. 25, 1936.  A. S. HOWELL  2,032,214
PHOTOGRAPHIC FILM MAGAZINE, SPOOL, AND FILM THEREFOR
Filed April 4, 1933  2 Sheets-Sheet 1
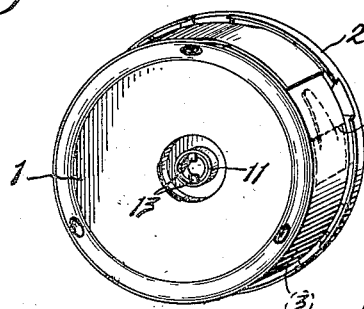
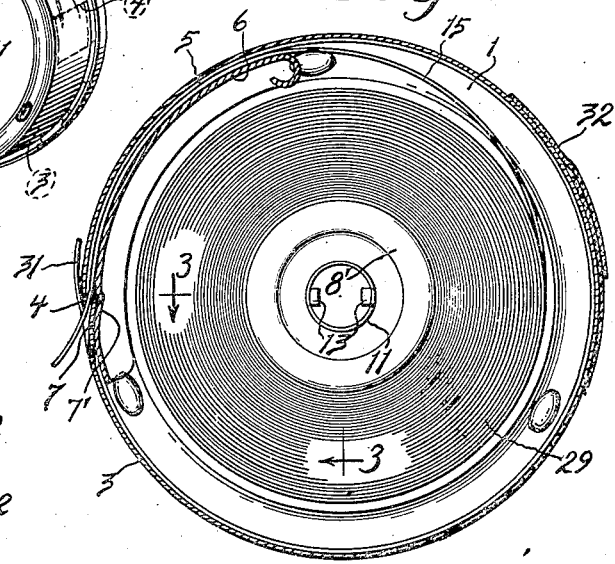
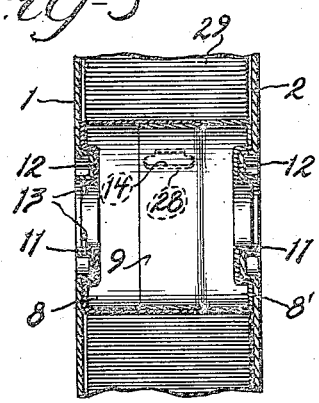
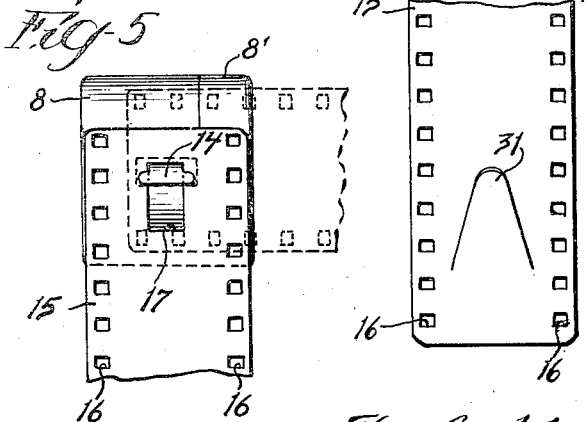
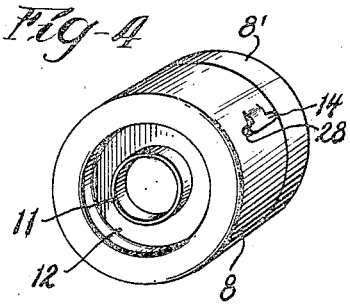
Inventor.
Albert S. Howell.
By: Robert F. Miehle, Jr.
Atty.

Feb. 25, 1936.  A. S. HOWELL  2,032,214
PHOTOGRAPHIC FILM MAGAZINE, SPOOL, AND FILM THEREFOR
Filed April 4, 1933    2 Sheets-Sheet 2
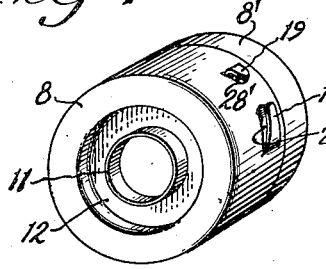
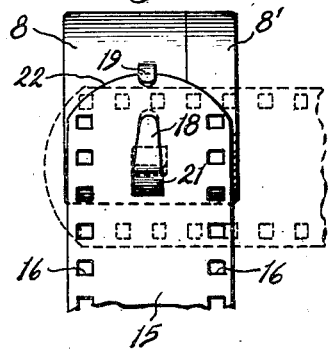
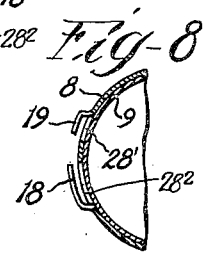
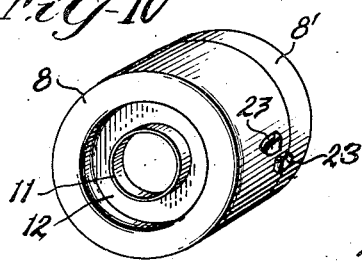
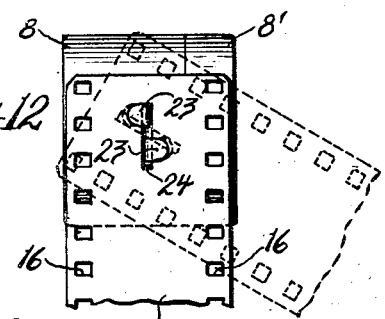
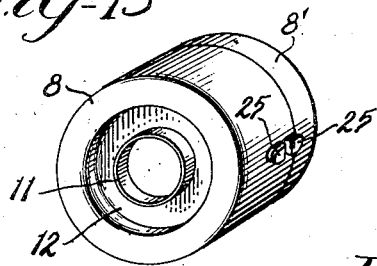
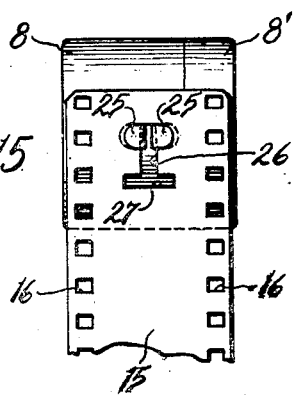
Inventor:
Albert S. Howell.
By: Robert F. Miehle
Atty.

Patented Feb. 25, 1936

2,032,214

UNITED STATES PATENT OFFICE 2,032,214

PHOTOGRAPHIC FILM MAGAZINE, SPOOL, AND FILM THEREFOR

Albert S. Howell, Chicago, Ill., assignor to The Bell & Howell Company, Chicago, Ill., a corporation of Illinois Application April 4, 1933, Serial No. 664,391

3 Claims. (Cl. 242—74)

My invention relates particularly to a photographic film magazine of the type used in carrying sensitized film in motion picture cameras and has for its objects the provision of a simple and effective means whereby the end of a film may be conveniently and securely fastened on a film spool, such as is employed in a magazine, with a view toward loading the magazine in the dark, and the provision of a simple and effective means whereby the end of the film projecting from the magazine is prevented from passing into the magazine where it is inaccessible except by opening the magazine, the invention embracing a loaded magazine which is ready for mounting in a camera and the lacing of a sensitized film, carried in the magazine, in the camera for photographing.

With these objects in view my invention consists in certain features of novelty in the construction, combination and arrangement of parts by which the said features and certain other features hereinafter appearing are effected, all as fully described with reference to the accompanying drawings and more particularly pointed out in the appended claims.

In the said drawings—

Figure 1 is a perspective view of a loaded motion picture film magazine embodying my invention;

Figure 2 is an enlarged section of the same taken normal to the axis thereof;

Figure 3 is a partial section taken on the line 3—3 of Figure 2;

Figure 4 is a perspective view of the film spool of the magazine;

Figure 5 is a side elevation of the film spool with a film end attached thereto;

Figure 6 is a partial face view of a film;

Figure 7 is a perspective view of a modified form of the film spool;

Figure 8 is a partial section of the spool of Figure 7 taken normal to the axis thereof;

Figure 9 is a side elevation of the spool of Figure 7 with a film end attached thereto;

Figure 10 is a perspective view of another modified form of the film spool;

Figure 11 is a partial section of the spool of Figure 10 taken on an axial plane thereof;

Figure 12 is a side elevation of the spool of Figure 10 with a film end attached thereto;

Figure 13 is a perspective view of another modified form of the film spool;

Figure 14 is a partial section of the spool of Figure 13 taken on an axial plane thereof; and Figure 15 is a side elevation of the spool of Figure 13 with a film end attached thereto.

Like characters of reference indicate like parts in the several views.

Referring to the drawings, the casing of the magazine is substantially circular, as shown, and comprises two parts 1 and 2, each of which forms one transverse wall of the casing and of which the part 2 forms the edge wall of the casing, indicated at 3. See Figures 1, 2, and 3. The parts 1 and 2 are detachably secured together, in a manner unnecessary to be described, and the edge wall 2 is provided with a film opening 4 which communicates with the interior of the magazine through a light traping film passage 5 provided by a curved film passage member 6 located within the casing in a suitable manner and cooperating with a portion of the curved edge wall 3 to form the film passage, the end of the passage adjacent the opening 4 being closed by a portion of the edge wall 3 being offset inwardly, as designated at 7, and engaged in a corresponding recess 7' in the film passage member.

The spool of the magazine is hollow and consists of two cylindrical cup shaped members 8 and 8' of which the member 8' has the lip portion of its cylindrical wall reduced, as designated at 9, and telescopically engaged tightly within the cylindrical wall of the other member to form the spool with the transverse walls of these members forming the ends of the spool. See Figures 3, 4, and 5.

The spool is revolubly mounted centrally within the magazine, as designated at 11, the casing and spool having nested light trapping formations, as designated at 12, and the hollow bearing portion at one end of the spool being provided with internal driving lugs 13 by means of which the spool may be rotated.

The magazine casing and spool, briefly described above, is fully described in my co-pending application, Serial No. 664,390 filed April 4, 1933, for improvement in Photographic film magazine, and requires no further description herein.

Referring to Figures 4 and 5, struck up from the material of the cylindrical wall of the member 8, of the spool, which overlies the cylindrical wall portion 9 of the other member 8' of the spool, is a T-shaped formation 14 having its leg fixed with the cylindrical wall from which it is struck and having its transverse portion disposed in overlying adjacently spaced relation with the body of the spool and extending axially thereof to form oppositely disposed hook formations on the periphery of the body of the spool and facing away from each other axially of the spool.

The formation 14 is disposed intermediate of the ends of the spool, and a motion picture film 15, provided with usual longitudinally spaced marginal feed perforations 16, is provided adjacent one end with an aperture 17 disposed intermediate the sides of the film and elongated longitudinally thereof. When the film is turned in its plane normal to its normal relative position with the spool, as shown in broken lines in Figure 5, the formation 14 will pass through the aperture 17 for engaging the film with or disengaging the film from the formation.

With the plane of the film disposed between the transverse portion of the formation 14, turning of the film to its normal relative position with the spool, as shown in full lines in Figure 5, causes the ends of the transverse portion of the formation 14 to overlie the film to secure the same on the spool, it being observed that the film is secured against disengagement in both directions lineally thereof and can only be disengaged by turning the same normal to its normal relative position with the spool.

Referring to Figures 7, 8, and 9, struck up from the material of the cylindrical wall of the member 8, of the spool, which overlies the cylindrical wall of the other member 8' of the spool, are opposing hook formations 18 and 19 adjacently spaced peripherally thereof and disposed intermediate the ends of the spool. In this case the film 15 is provided adjacent one end with an aperture 21 disposed intermediate the sides of the film and engageable with the longer hook formation 18, and has the adjacent end curved, as designated at 22, so that turning of the film in its plane engages and disengages the hook formation 19 from the end of the film, as shown by the broken line and full line positions of the film in Figure 9.

When the film is in its normal relative position with the spool, as shown in the full line position of the film in Figure 9, the end of the film is engaged in the hook formation 19 to maintain the film against disengagement of the hook formation 18 from the aperture 21, the film being thus secured against disengagement in both directions lineally thereof and being only disengaged by turning the same normal to its normal relative position with the spool.

Referring to Figures 10, 11, and 12, struck up from the material of the cylindrical wall of the member 8, of the spool, which overlies the cylindrical wall of the other member 8' of the spool, are a pair of oppositely disposed hook formations 23 disposed intermediate the ends of the spool and which face away from each other axially of the spool and are arranged peripherally of the spool in adjacent relation. In this case the film 15 is provided adjacent one end with an aperture 24 disposed intermediate the sides of the film and elongated longitudinally thereof and engageable and disengageable with the hook formations 23 by turning the film in its plane, as shown by the broken line and full line positions of the film in Figure 12, the film being only disengaged by turning the same normal to its normal relative position with the spool.

Referring to Figures 13, 14, and 15, struck up from the material of the cylindrical wall of the member 8, of the spool, which overlies the cylindrical wall of the other member 8' of the spool, are a pair of oppositely disposed hook formations 25 disposed intermediate the ends of the spool and which face away from each other and are alined axially of the spool. In this case the film 15 is provided adjacent one end with a T-shaped aperture 26 disposed intermediate the sides of the film and having the leg thereof extending longitudinally of the film and engageable and disengageable with the hook formations 25 by facewise curving the film at the transverse portion of the aperture 26 to clear the continuous longitudinal edge 27 of the transverse portion of the aperture from the hook formations 25 during engagement and disengagement of the film, the normal shape of the film facewise thereof causing the said edge 27 to engage the hook formations 25, when the aperture 26 is engaged therewith, to prevent lineal movement of the film relative to the spool in the disengaging direction.

In each case the film is positively secured with the spool and cannot accidentally become disengaged within the magazine, the engagement and disengagement of the film with the spool being easily accomplished in the dark room for the removal of sensitized film from the magazine or the loading of the magazine with sensitized film.

In each case the reduced portion 9 of the cylindrical member 8', of the spool, underlies the aperture or apertures, resulting from the striking up therefrom of the film engaging formations and designated at 28 in Figures 3 and 4, at 28' and $28^2$ in Figures 7 and 8, at $28^3$ in Figure 11 and at $28^4$ in Figure 14, in the cylindrical wall of the other member 8, which surrounds the reduced portion 9, so that the aperture or apertures 28 are light trapped.

When the magazine is loaded, the film 15 is rolled on the spool within the casing, as designated at 29 in Figures 2 and 3, with the inner end of the film secured on the film spool and the outer end portion of the film extending through the film passage 5 and through the film opening 4 and projecting exterior of the magazine for the lacing of the film in a camera in which the magazine is mounted.

The film 15 is provided adjacent its outer end with a stopping tab 31 struck up from the material of the film intermediate the sides thereof and extending longitudinally of the film away from its outer end, which stopping tab is engageable with an edge of the film opening 4 of the magazine casing to prevent the outer end of the film from passing through the film opening into the magazine. See Figures 1, 2, and 6.

A wrapper 32 of suitable material preferably surrounds the casing and overlies the film opening 4 and the exterior portion of the film for purpose of storage and handling of the loaded magazine prior to its mounting in a camera, the wrapper being removed when the loaded magazine is mounted in a camera.

Having thus described my invention, I do not wish to be limited to the precise details described as changes may be readily made without departing from the spirit of my invention, but having thus described my invention, I claim as new and desire to secure by Letters Patent the following.

1. In a film spool the combination with a body, of means on said body and cooperating with an aperture in a film which aperture is elongated longitudinally of the film to detachably secure the film on said body and comprising oppositely disposed hook formations on the periphery of said body and facing away from each other axially of the spool and adapted to permit disengagement of the film with angular movement of the film in its plane relative to said body.

2. In a film spool the combination with a hollow body comprising two cylindrical oppositely disposed cup shaped members having their cylindrical walls telescopically engaged to form the body, of means struck up from the material of the cylindrical wall which overlies the other cylindrical wall for securing a film on the spool, the second mentioned cylindrical wall underlying the resulting opening in the first mentioned cylindrical wall and light trapping the same.

3. In a film spool the combination with a hollow body comprising two cylindrical oppositely disposed cup shaped members having their cylindrical walls telescopically engaged to form the body, of oppositely disposed hook formations struck up from the material of the cylindrical wall which overlies the other cylindrical wall for cooperating with an aperture in a film for detachably securing the film on the spool, the second mentioned cylindrical wall underlying the resulting opening or openings in the first mentioned cylindrical wall and light trapping the same.

ALBERT S. HOWELL.